Dec. 8, 1970    J. MEDNEY    3,546,000
METHOD FOR IMPREGNATING GLASS FILAMENT REINFORCEMENT ROVINGS
Filed Jan. 23, 1968
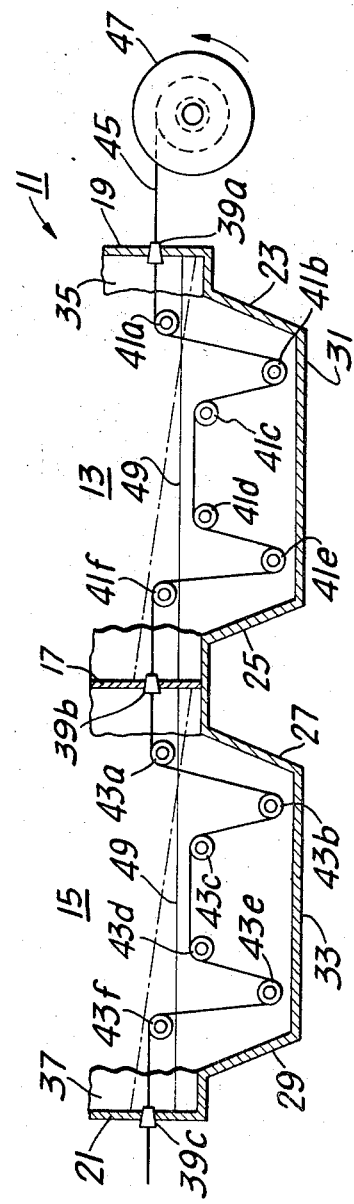
INVENTOR.
JONAS MEDNEY
BY Sherman H Barber
his Attorney

United States Patent Office 3,546,000
Patented Dec. 8, 1970

3,546,000
**METHOD FOR IMPREGNATING GLASS FILA-
MENT REINFORCEMENT ROVINGS**
Jonas Medney, Oceanside, N.Y., assignor to Koppers
Company, Inc., a corporation of Delaware
Filed Jan. 23, 1968, Ser. No. 699,825
Int. Cl. B44d 1/44; C03c 25/02
U.S. Cl. 117—62.2                                        5 Claims

ABSTRACT OF THE DISCLOSURE

Method for prolonging the pot life of heat hardenable resins of the type used in filament winding comprises passing the glass filament rovings through a first mixture containing resin hardener and then through a second mixture containing a resin activator. The resin coating on the rovings, being a combination of the first and second mixtures, sets rapidly, but the pot life of each mixture is extended considerably.

BACKGROUND OF THE INVENTION

This invention relates to filament winding and, more particularly, to improved method for extending the pot life of the resin used in a filament winding system.

One of the problems that is inherent in making filament reinforced resin structures is to provide a resin system that has both a long pot life and a fast rate of curing. Heretofore, no single resin system has been able to accomplish these apparently opposite achievements. However, the method of the present invention is adapted to extend the pot life of the resin mixture for a considerably longer period than has been heretofore possible.

SUMMARY OF THE INVENTION

The method of the invention comprises coating filament rovings with a first resin mixture containing a polymerization catalyst, and, thereafter, coating the already coated rovings with a second resin mixture containing a catalyst promoter, whereby the resin coating on the rovings sets rapidly.

For a further understanding of the invention and for advantages and features thereof reference may be made to the following description in conjunction with the drawing which shows one form of apparatus suitable for carrying into practice the method of the invention.

BRIEF DESCRIPTION OF THE DRAWING

The drawing illustrates schematically one form of apparatus for carrying into practice the method of the invention.

DETAILED DESCRIPTION

The apparatus 11 shown in the drawing includes first and second resin receptacles or pans 13, 15 which are similar in shape and size, and which are joined together at a common wall 17.

Each receptacle 13, 15 is ordinarily open at the top, and is comprised of: an end wall 19, 21 situated in spaced relation to the common wall 17; sloping walls 23, 25 and 27, 29 connecting the common wall 17 and the end walls 19, 21 to a flat bottom 31, 33; and opposed side walls 35, 37 connected to the other walls. Only one of the side walls 35, 37 of each receptacle 13, 15 is shown for clarification purposes.

In the end walls 19, 21, and in the common wall 17, there are mounted, at substantially the same level, orifices 39a, 39b, and 39c. Each orifice, preferably, is shaped like the orifice shown and described in my copending application Ser. No. 631,642,, filed Apr. 18, 1967, now Pat. 3,471,322 issued Oct. 7, 1969. The orifices 39a, 39b, 39c are, then, substantially coaxial and all of the orifices are oriented in the same direction. That is to say, the entrance end of the orifices is at the right, and the discharge end of the orifices is at the left, as viewed in the drawing.

Within each receptacle 13, 15, there are a plurality of horizontally arranged, spaced apart cylindrical breaker bars or rods 41a–41f, and 43a–43f, which are secured to the opposing side walls 35, 37. The breaker rods 41a, 41f, and 43a, 43f, are so situated that a line tangent to the top of these rods coincides substantially with the axes of the orifices 39a, 39c. The breaker rods 41b, 41e, and 43b, 43e are disposed at substantially the same level and just above the bottom 31, 33 of their respective receptacles 13, 15. Likewise, the breaker rods 41c, 41d, and 43c and 43d, are disposed at substantially the same level, located between the level of the breaker rods 41a, 41f, and 41b, 41e.

Filament reinforcements 45, in the form of rovings for example, lead from one or more supply spools 47 (only one being shown) through the orifice 39a, over the breaker bar 41a, under the breaker bar 41b, over bars 41c, 41d, under bar 41e, over bar 41f, and thence through orifice 39b. In the other receptacle 15, the rovings 45 follow a similar path and then pass through orifice 39c.

Each receptacle 13, 15, contains a mixture comprising a resin and a hardener, but the mixture of the resin and hardener in receptacle 13 is not the same as the mixture of the resin and hardener in receptacle 15, for reasons that will become readily apparent hereinafter.

Generally, the method of the invention comprises the steps of threading the rovings 45 into and through the apparatus as described hereinbefore, so that the rovings are immersed in and become resin impregnated in the first receptacle 13 with the mixture therein contained; the rovings 45 then pass into the second receptacle 15, where the rovings are immersed in and are further impregnated with the mixture in the second receptacle. The combination of the two mixtures produces rovings impregnated with a resin that readily hardens when subjected to heat.

As is known in the art, there are several types of resin which are in common use at the present time. When a polyester type of resin is being used, the mixture in receptacle 13 is a known polyester resin and a polymerization catalyst, such as benzoyl peroxide, which is known in the trade as BPO. The mixture in the receptacle 15 is the same polyester resin and a catalyst promoter, such as dimethylaniline, which is known in the trade as DMA. Both mixtures are relatively stable under normal operating conditions.

As the filament rovings 45 move through the first receptacle 13, they become impregnated with the mixture in that receptacle, and then, after passing through orifice 39b, which removes the excess resin from the filaments, they become impregnated with the mixture in the second receptacle 15. As the rovings 45 pass through orifice 39c, excess resin is removed, and the emergent rovings are impregnated with a resin that comprises both the mixture in the first receptacle and the mixture in the second receptacle.

Those skilled in the art will recognize that the resin mixture, with which the rovings 45 are impregnated when the rovings emerge from the second receptacle 15, cures rapidly; the action being that the DMA activates the BPO at a lower temperature than is ordinarily used. Thereby, the resin mixture of the rovings leaving the apparatus will cure faster than if the resin only contained BPO. However, the pot life of each resin mixture in receptacles 13, 15 is significantly prolonged, since each mixture is relatively stable by itself.

In like manner, in an anhydride-epoxy resin system, the mixture in receptacle 13 may be an epoxy resin and an anhydride, while the mixture in receptacle 15 may be the same epoxy resin and a catalyst or promoter such as benzyldimethylamine which is known in the trade as BDMA or 2-ethyl-4-methyl imidazole which is known in the trade as EMI–24. Both mixtures are relatively stable by themselves, but when the rovings 45 pass through both mixtures, in the manner described hereinbefore, the rovings are impregnated with a resin mixture that cures rapidly. However, the pot life of each resin mixture is significantly prolonged.

Similarly, in an amine epoxy system, the mixture in receptacle 13 is comprised of an epoxy resin and an amine hardener, and the substance in receptacle 15 is comprised only of epoxy resin. An amine hardener such as metaphenylenediamine, which is known in the trade as CL, may be used with any of the well known amine hardenable epoxy resins in the ratio up to 50–50. A mixture of epoxy resin and CL is relatively stable at ratios up to 50–50, and will only become active upon mixing with additional epoxy resin which, in effect, reduces the ratio of the amine hardener CL to the epoxy resin to about 15 parts CL to 100 parts of resin.

Those skilled in the art will recognize that in practicing the method of the invention, make-up resin mixture must be added from time to time to each receptacle. Such additional fresh make-up resin mixture, when added to the second receptacle, so dilutes the effect of the promoter on any catalyst that might be diffused in the second mixture, that no premature setting-up of the resin in the second receptacle takes place.

A feature of the invention is that by carefully controlling the amount of resin applied to the filaments in each receptacle, a more satisfactory control is achieved over the final proportion of hardener accelerator and resin mixture that is applied to the filament roving.

A feature of the invention is that the respective mixtures by themselves are relatively stable, thereby prolonging the pot life of each mixture; but, when the rovings are impregnated with the combined mixtures, the combined resin mixture cures faster than the type of resin mixture presently used.

While the invention has been described herein with a certain degree of particularity, it is understood that the present disclosure has been made only as an example and that the scope of the invention is defined by what is hereinafter claimed.

What is claimed is:

1. The method for impregnating glass filament reinforcement rovings with a heat hardenable liquid resin comprising the steps:
   (a) immersing said rovings in a first mixture consisting essentially of a liquid resin and a polymerization catalyst; and thereafter
   (b) immersing said rovings in a second mixture consisting essentially of said liquid resin and a catalyst promoter whereby said rovings are impregnated with said heat hardenable liquid resin.

2. The method of claim 1 wherein:
   (a) said first mixture is a polyester resin and said polyester catalyst is benzoyl peroxide; and
   (b) said second mixture is the same polyester resin and dimethylaniline.

3. The method of claim 1 wherein:
   (a) said first mixture is an epoxy resin of the anhydride curable type and an anhydride; and
   (b) said second mixture is the same epoxy resin and benzyldimethylamine.

4. The method for impregnating glass filament reinforcement rovings with a heat hardenable liquid resin comprising the steps:
   (a) immersing said rovings in a mixture consisting essentially of a liquid epoxy resin of the amine curing type and an amine curing agent, combined in the ratios of up to 50 parts resin and 50 parts curing agent; and thereafter
   (b) immersing the filament rovings in a bath consisting of the same type of epoxy resin whereby the proportion of amine curing agent to epoxy resin is reduced to a range for optimum heat hardening.

5. The method of claim 4 wherein:
   (a) said amine curing agent is metaphenylenediamine.

References Cited
UNITED STATES PATENTS

| | | | |
|---|---|---|---|
| 2,684,305 | 7/1954 | Quialivan | 117—62.2X |
| 2,902,398 | 9/1959 | Schroeder | 117—76X |
| 3,116,160 | 12/1963 | Varlet | 117—62.2 |
| 3,135,625 | 6/1964 | Ingrassia | 117—62.2 |
| 3,139,657 | 7/1964 | Maly | 117—62.2X |
| 3,156,580 | 11/1964 | Howard | 117—62.2X |
| 3,308,007 | 3/1967 | Shepard | 117—76X |
| 3,405,102 | 10/1968 | Kugler et al. | 117—161X |
| 3,409,577 | 11/1968 | Wong et al. | 117—161X |
| 3,411,940 | 11/1968 | Lopez et al. | 117—62.2 |
| 3,423,230 | 1/1969 | Georges | 117—62.2 |

FOREIGN PATENTS

| | | | |
|---|---|---|---|
| 698,689 | 11/1964 | Canada | 117—62.2 |

WILLIAM D. MARTIN, Primary Examiner

M. R. LUSIGNAN, Assistant Examiner

U.S. Cl. X.R.

117—115, 126